Figure 1:
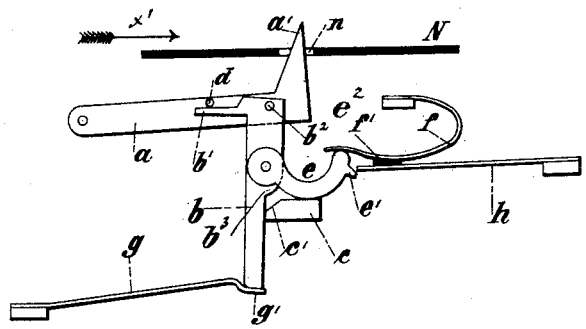

(No Model.) 7 Sheets—Sheet 1.
F. PIETSCHMANN.
MECHANICAL MUSICAL INSTRUMENT.

No. 474,999. Patented May 17, 1892.

WITNESSES:
Charles Schroeder.
Charles Bliss

INVENTOR
F. Pietschmann
BY
ATTORNEYS (No Model.) 7 Sheets—Sheet 2.
F. PIETSCHMANN.
MECHANICAL MUSICAL INSTRUMENT.
No. 474,999. Patented May 17, 1892.
FIG. 4.
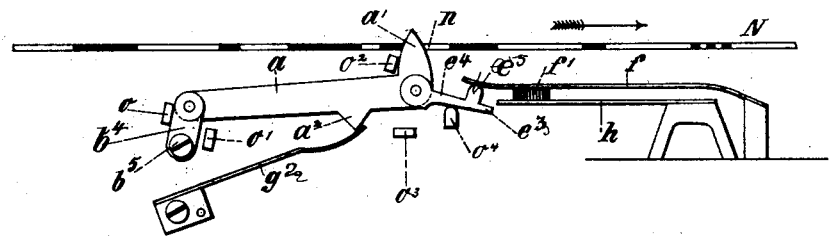
FIG. 4ª.
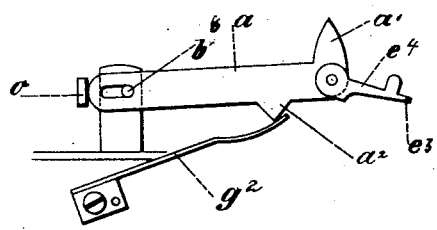
FIG. 5.
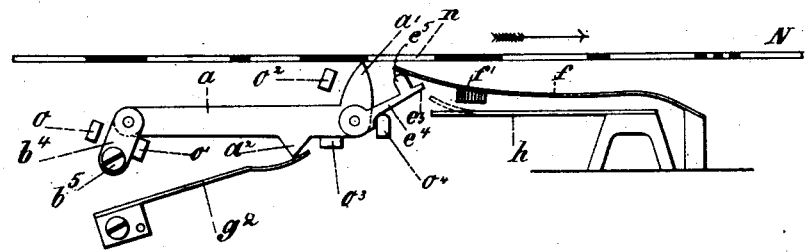
FIG. 6.
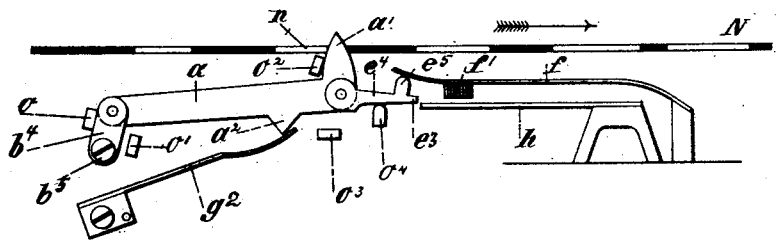
WITNESSES:
Charles Schroeder.
C. Bees
INVENTOR
F. Pietschmann
BY Jacques Raegener
ATTORNEYS.

(No Model.) 7 Sheets—Sheet 3.
F. PIETSCHMANN.
MECHANICAL MUSICAL INSTRUMENT.
No. 474,999. Patented May 17, 1892.
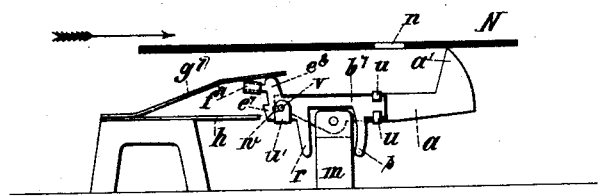
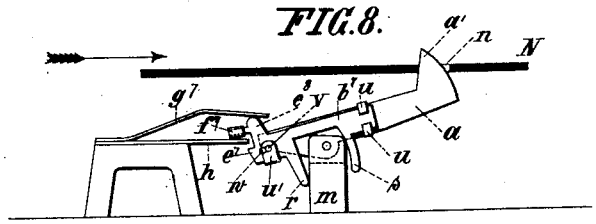
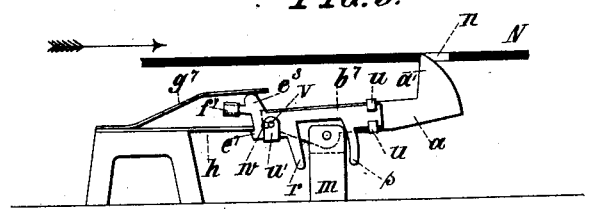
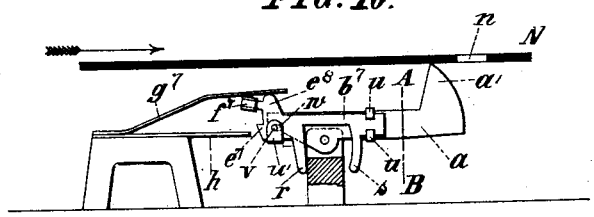
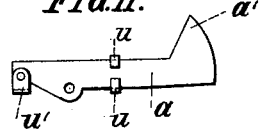
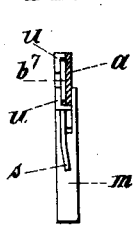
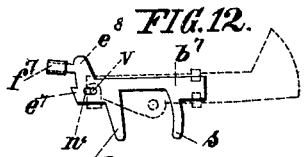
WITNESSES:
Charles Schroeder.
Charles Bles
INVENTOR
F. Pietschmann
BY Gosque & Raegener
ATTORNEYS.
THE NORRIS PETERS CO., PHOTO-LITHO., WASHINGTON, D. C.

(No Model.)

F. PIETSCHMANN.
MECHANICAL MUSICAL INSTRUMENT.

No. 474,999. Patented May 17, 1892.

(No Model.) 7 Sheets—Sheet 5.

F. PIETSCHMANN.
MECHANICAL MUSICAL INSTRUMENT.

No. 474,999. Patented May 17, 1892.

WITNESSES:
Charles Schroeder
C. Bles

INVENTOR
F. Pietschmann
BY
Forrest Raegener
ATTORNEYS.

(No Model.) 7 Sheets—Sheet 6.

F. PIETSCHMANN.
MECHANICAL MUSICAL INSTRUMENT.

No. 474,999. Patented May 17, 1892.

WITNESSES:
Charles Schroeder
Charles Poles

INVENTOR
F. Pietschmann
BY Jocque Ragener
ATTORNEYS.

(No Model.) 7 Sheets—Sheet 7.
F. PIETSCHMANN.
MECHANICAL MUSICAL INSTRUMENT.
No. 474,999. Patented May 17, 1892.
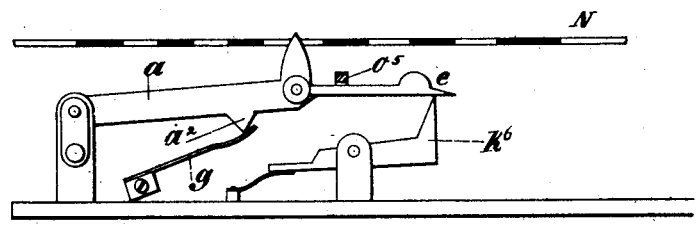
FIG. 26.
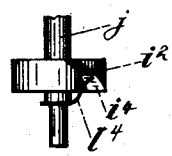 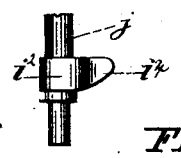 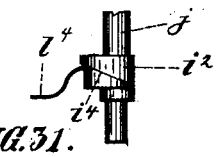
FIG. 27.  FIG. 28.  FIG. 29.
FIG. 30.  FIG. 31.
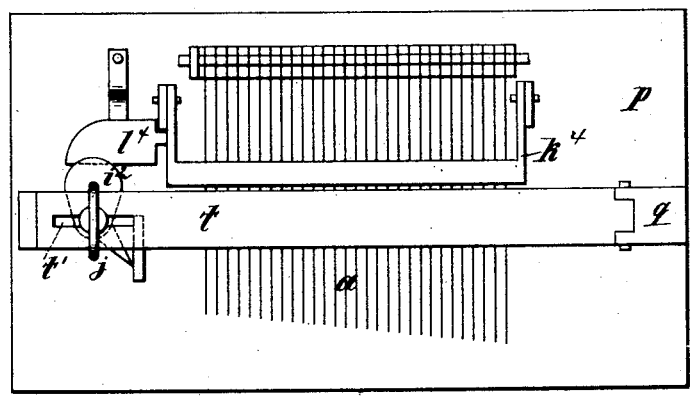
FIG. 32.
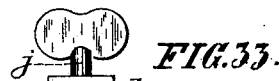
FIG. 33.
WITNESSES: 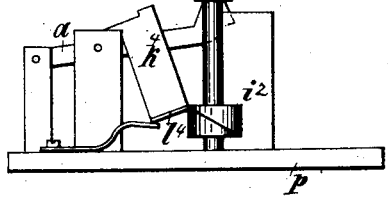 INVENTOR
F. Pietschmann
BY
ATTORNEYS

UNITED STATES PATENT OFFICE.

FERDINAND PIETSCHMANN, OF BERLIN, GERMANY.

MECHANICAL MUSICAL INSTRUMENT.

SPECIFICATION forming part of Letters Patent No. 474,999, dated May 17, 1892.

Application filed October 29, 1891. Serial No. 410,246. (No model.) Patented in Austria-Hungary August 1, 1891, No. 36,656 and No. 61,711; in England August 18, 1891, No. 13,903, and in France August 19, 1891, No. 202,271.

*To all whom it may concern:*

Be it known that I, FERDINAND PIETSCHMANN, a citizen of Germany, residing at Berlin, in the Kingdom of Prussia, Germany, have invented certain new and useful Improvements in Mechanical Musical Instruments, (for which Letters Patent have been obtained in Great Britain in the name of The Berliner Musik-Instrumenten-Fabrik Actien-Gesellschaft, vormals Chas. F. Pietschmann & Soehne, of Berlin, dated August 18, 1891, No. 13,903, in Austria-Hungary in the name of The Berliner Musik-Instrumenten-Fabrik Actien-Gesellschaft, vormals Chas. F. Pietschmann & Soehne, dated August 1, 1891, No. 36,656 and No. 61,711, and in France in the name of F. Pietschmann, dated August 19, 1891, No. 202,271,) of which the following is a specification.

This invention relates to improvements in the so-called "automatical" or "mechanical" musical instruments, and relates especially to that kind of instruments in which a scale of metal tongues or reeds are vibrated by mechanical means through the medium of push-point levers operated and controlled by a traveling music-sheet having perforations or impressions arranged in the same according to the tune, in the well-known manner.

This invention consists in the combination, with push-point levers, of levers for operating the tongues or reeds, springs acting on the push-point levers, and a pivoted or slotted music-sheet, said tongue-operating levers being so arranged and accommodated that they only vibrate the tongues while moving in one direction and are carried forward past the tongues while moving in the opposite direction.

This invention also consists in the combination of said push-point levers and tongue-operating levers and means for moving the push-point levers upward and shifting the tongue-operating levers out of the way before a new music-sheet is introduced.

This invention further consists in the construction and combination of parts and details, as will be fully described and set forth hereinafter, and finally pointed out in the claims.

Figure 2:
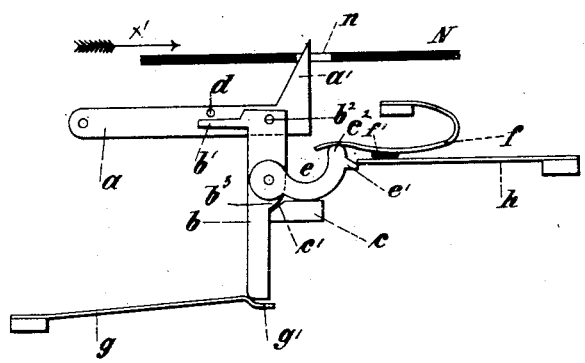
Figure 3:
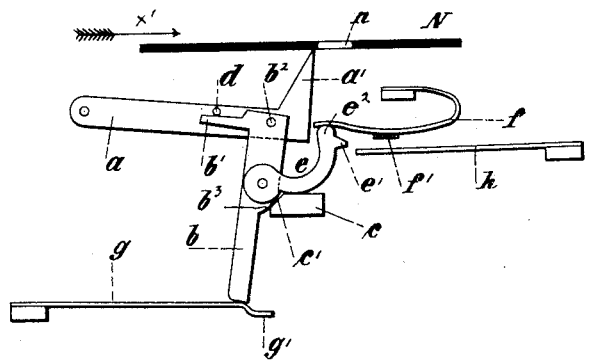
Figure 14:
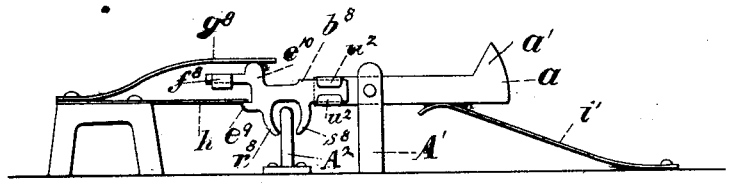
Figure 15:
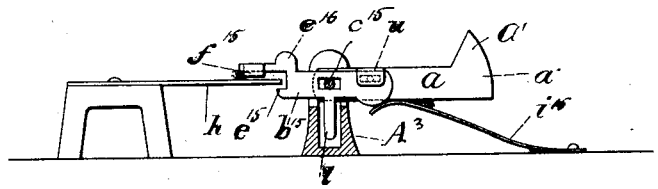
Figure 16:
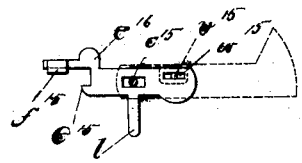
Figure 17:
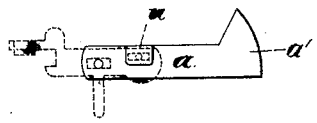
Figure 18:
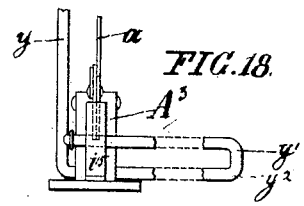
Figure 19:
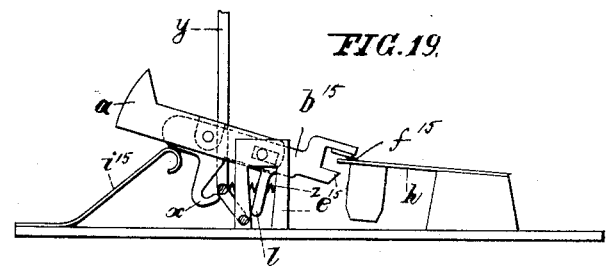
Figure 20:
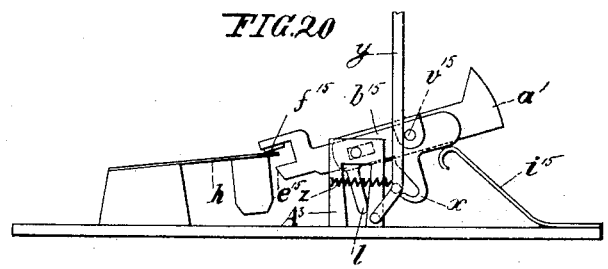
Figure 21:
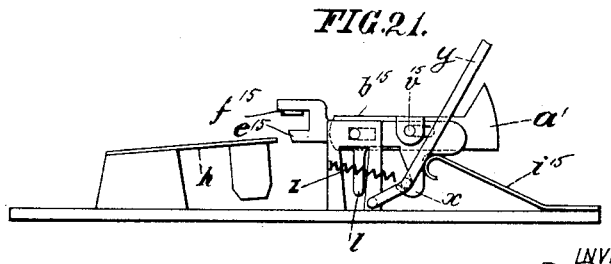
Figure 22:
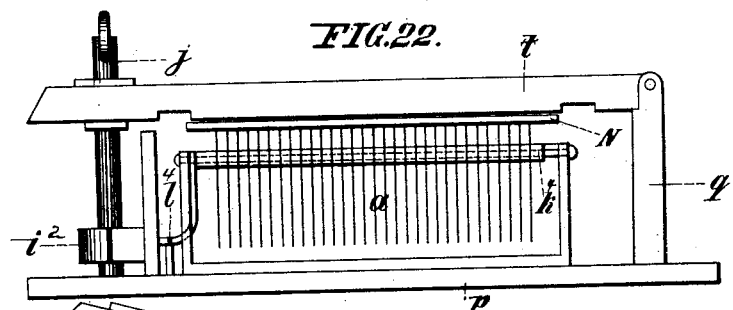
Figure 23:
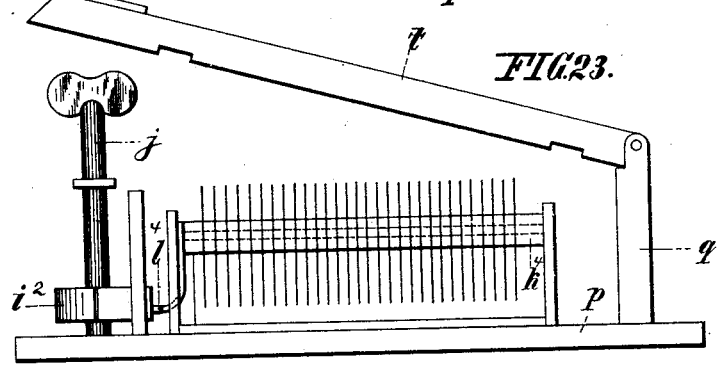
Figure 24:
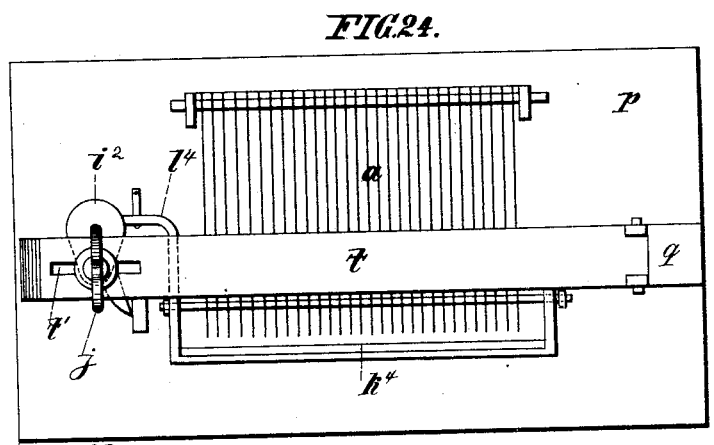
Figure 25:
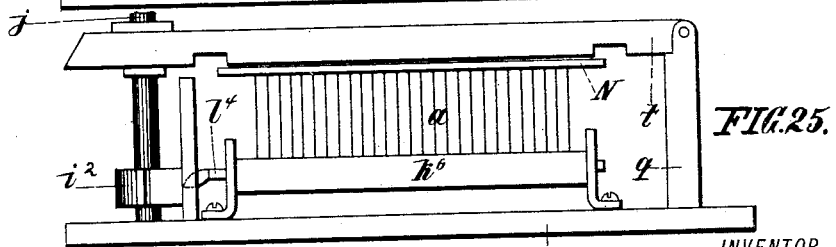

In the accompanying drawings, Figures 1, 2, and 3 are detail elevations of one construction of my improved mechanism for vibrating the reeds or tongues, a part of the music-sheet being shown in section, and the parts of the mechanism being shown in different positions in the three figures. Figs. 4, 5, and 6 are similar views of a modification of my improved mechanism for vibrating the tongues or reeds, parts of the music-sheet being shown in longitudinal section and the parts of the mechanism having different positions in the several figures. Fig. 4ª shows a modification of the construction shown in Figs. 4, 5, and 6. Figs. 7, 8, 9, and 10 are side elevations of a further modification of my improved mechanism for vibrating the reeds or tongues, parts of the music-sheet being shown in longitudinal section and parts of the mechanism being in different positions in the several figures. Fig. 11 is a side view of part of the operating-lever. Fig. 12 is a side view of the other part of the operating-lever. Fig. 13 is a transverse sectional view on the line A B of Fig. 10. Fig. 14 is a side elevation of another modification of my improved mechanism for vibrating the tongues or reeds. Fig. 15 is a side elevation of a further modification of the same, parts being in section. Figs. 16 and 17 are side views of the two parts of the operating-lever of the construction shown in Fig. 15. Fig. 18 is an end elevation of one of the levers for vibrating a tooth or reed, showing a further modified construction, and also showing the mechanism for throwing the levers out of gear. Figs. 19, 20, and 21 are vertical elevations of said modified construction, shown in end view of Fig. 18, also showing the mechanism for throwing the several levers out of gear. Figs. 22 and 23 are end views of a series of operating-levers and the retaining-bar for the music-sheet, showing the parts in different position. Fig. 24 is a plan view of the same, showing a slight modification. Fig. 25 is an elevation of the construction shown in Fig. 24. Fig. 26 is a side elevation of one of the operating-levers, showing the mechanism for throwing the same out of gear when the music-sheet is to be introduced. Figs. 27, 28, and 29 are side views of the cam on the locking-spindle for the retaining-bar. Fig. 30 is a plan view of said cam, the spindle being shown in section. Fig. 31 is a vertical transverse sectional view of the retaining-bar. Fig. 32 is a plan view of a series of operating-levers and the retaining-bar and mechanism for throwing the operating-levers out of gear. Fig. 33 is an end view of a series of operating-levers and an end view of the retaining-bar and elevation of the spindle for locking the retaining-bar.

Similar letters of reference indicate corresponding parts in all the figures.

Figs. 1, 2, and 3 represent one construction of my improved device for striking or vibrating the reeds or tongues of a musical instrument by means of push-point levers operated by a traveling perforated music-sheet. The perforated music sheet N travels in the direction of the arrow $X'$ and is provided with the slots or recesses $n$. The lever $a$ is provided with a beveled push-point $a'$, adapted to enter the perforations or slots of the traveling music-sheet N corresponding in number and position to the number and arrangements of reeds or tongues $h$ on the scale. As the general arrangements of the reeds and tongues and the push-point levers $a$ are well known, the illustrations will be sufficient to illustrate the device, although but one push-point lever and corresponding mechanism are shown. To each operating-lever $a$ an elbow-lever $b$ is pivoted at $b^2$, the lateral movement of which elbow-lever, when the corresponding lever $a$ is being forced up and down, is controlled by the fixed bar or ledge $c$ at one side of said lever $b$ and by a pin or stud $d$, projecting laterally from the corresponding lever $a$, slightly above the arm $b'$ of said elbow-lever $b$. The lever $b$ carries a pivoted arm $e$, the forward point or finger $e'$ of which is adapted to strike the free end of a metal reed or tongue $h$ to vibrate the same. A lug or projection $e^2$ is formed on the upper edge of said arm $e$, and the spring $f$, carrying the damper $f'$, exerts a downward pressure on said lug, thus tending to force the arm $e$ downward, the damper $f'$ coming in contact with the reed or tongue $h$ at the proper time, so as to cause the vibrations and tones to cease. The lower end of the pivoted lever $b$ is supported by a spring $g$, the forward end of which is bent to form a step $g'$, and serving as a rest or support for the lever $b$. The bar or ledge $c$ is provided with the beveled upper edge $c'$, and the lever $b$ is provided with a beveled shoulder $b^3$, adjacent to the beveled edge of the ledge or bar $c$.

The operation of this device is as follows: When the push-point $a'$ of the lever $a$ has entered a slot $n$ of the music-sheet N, as shown in Fig. 1, the arm $b'$ of the lever $b$ rests against the pin or stud $d$, and the downwardly-projecting arm of said elbow-lever bears against the bar or ledge $c$, and the lower end of said lever $b$ rests on the step $g'$ of the spring $g$. The pivoted arm $e$ is forced down by the pressure of its spring $f$ in its lowest position, the finger $e'$ being below the free end of the reed or tongue $h$. As the music sheet travels in the direction of the arrow $X'$, the push-point $a'$ of the lever $a$ is forced down and out of the slot or aperture $n$, and the lever $a$ is also forced down, as shown in Fig. 2. The arm $b'$ of the elbow-lever $b$ during the descent of the lever $a$ is moved slightly from the stop or pin $d$ on the lever $a$, owing to the pressure exercised by the spring $g$; but the lever $b$ remains in close contact with the bar or ledge $c$. As the lever $b$ descends, the arm $e$, which is carried by the same, is lifted by the fixed bar $c$, causing the finger $e'$ to vibrate the reed $h$. Before the finger $e$ strikes against the end of the reed $h$ the lug $e^2$ of the arm $e$ has lifted the damper $f$, thus permitting the tongue or reed to vibrate freely and produce the tone. When the lever $a$ has been fully forced down, as shown in Fig. 3, the lever $b$ has been forced to the left by the action on each other of the beveled parts of the bar $c$ and the lever $b$, and thereby the lever-arm $b'$ is again forced into contact with the stop or pin $d$ and the lower end of the lever $b$ is shifted from the step $g'$ to the upper portion of the spring $g$. All of the parts remain in this position, as indicated in Fig. 3, until the next slot or aperture $n$ presents itself above the push-point $a$, which is thrown into it by the upward pressure of the spring $g$, as shown in Fig. 1. The pivoted arm $e$ of the lever $b$ is forced down by the pressure of the spring $f$, and the finger $e$ would strike the end of the reed or tongue $h$ again if it were not carried freely past the end of said tongue, owing to the inclined position of the lever $b$, as shown in Fig. 3, and also owing to the fact that the lower end of said lever $b$ rests on the upper portion of the spring $g$. The position Fig. 1 is obtained again when the finger $e'$ has reached its lowest position and the stop or pin $d$ has forced the lever $b$ down upon the step $g'$ of the spring $g$. By providing a rigid support for the arm $e$ and finger $e'$ during the striking of the reed, which support consists of the bar or ledge $c$, the resistance of the reed or tongue is considerably increased and its vibrations rendered very strong and effective in tone.

In the modification shown in Figs. 4, 5, and 6 the lever $a$ is pivoted to the link $b^4$, which is pivoted at $b^5$, and is limited in its forward and backward movements by the two stop-bars $o$ and $o'$, the play of said lever $b^4$ between said stops being sufficient to allow the free end or finger $e^3$ of the arm $e^4$, pivoted to the push-point lever $a$, to be withdrawn from the free end of the reed or tongue $h$ or to be carried below said reed. Instead of pivoting the lever $a$ to the lever $b^4$, the said lever may be fulcrumed on the shaft $b^6$, Fig. $4^a$, said shaft passing through a slot of the lever $a$ to permit of the required play between the forward and backward sliding motion of said lever. A lug $a^2$ is formed on the bottom edge of the lever $a$, said lug having inclined edges against which the spring $g^2$ acts, which produces the upward pressure against the lever $a$ to cause the push-point $a'$ to enter the slots $n$ of the music-sheet N as said slots appear above said push-point. The descent of the lever $a$, caused by the pressure of the traveling music-sheet N, is limited by a stop or bar $o^3$, and the upward throw of said lever $a$, caused by this pressure of the spring $g^2$, is equally limited by the stop or bar $o^2$, the said stops or bars being fixed or secured in the casing or frame of the instrument. The said stops $o^2$ and $o^3$ are so arranged that they do not interfere with a limited longitudinal throw or play of the lever $a$. The arm $e^4$, as stated, carries a finger $e^3$ for striking or vibrating the reed $h$, and the said arm is supported by a stop $o^4$, rigidly secured in the casing or frame of the instrument. As the lever $a$ is forced down from the position shown in Fig. 5 by the action of the music-sheet, the said pivoted arm $e^4$ and its finger $e^3$ are lifted by the stop $o^4$, whereby the finger $e^3$, which at the time has been shifted below the free end of the reed $h$, strikes the reed and vibrates the same. The shifting of the lever $a$ and arm $e^4$ toward the reed is caused by the frictional contact of the music-sheet N, traveling in the direction toward the reed or tongue. The arm $e^4$ is provided with a lug or projection $e^5$ above the finger $e^3$, which lug serves to lift the spring $f$ and damper $f'$ on the same just before the reed is vibrated, and the said spring $f$ after the reed has been vibrated forces the arm $e^4$ down again and places the damper $f'$ upon the reed at the proper time. As shown in Fig. 6, when a slot or perforation $n$ of the music-sheet appears above the push-point $a'$ of a lever $a$ the latter is thrown upward by the pressure of the spring $g^2$; but as the said spring exerts its pressure against the forward inclined edge of the lug $a^2$ of the lever $a$ it not only throws the lever $a$ upward, but also backward, or to the left, whereby the arm $e^4$ and its finger $e^3$ are sufficiently withdrawn from the end of the reed $h$ to allow the finger $e^3$ to pass freely past the end of the reed or tongue.

In the constructions Figs. 7 to 13 a further modification of the mechanism is shown. In this construction the striking-lever $b^7$ is mounted to slide on the push-point lever $a$, and is held and guided on said lever by the hook-lugs $u\ u'$. The push-point lever $a$ is pivotally supported on the bridge or bar $m$, and the striking-lever $b^7$ has formed on or secured to its lower edge arms or projections $r\ s$, which constitute a fork to embrace said bridge or bar $m$. The throw of the lever $b^7$ alongside the lever $a$ is limited by the slot $w$ and a pin $v$, passing through said slot, which pin also prevents the said lever $b^7$ from being disengaged from the lever $a$. At the rear end of the lever $b^7$ a finger $e^7$ is formed, which, as the lever $b^7$ is shifted to the left, is carried below the free end of the reed $h$, as shown in Fig. 8. Above the said finger $e^7$ a lug $e^8$ is formed on the lever $b^7$ and projects upward slightly and is forced downward by the action of the spring $g^7$, resting on the same. From the said lug $e^8$ a pin or arm projects, upon which the damper-sleeve $f^7$ of elastic material—such as rubber, cloth, leather, and the like—is fitted. Said damper is preferably made or formed of a short piece of india-rubber tubing, as by sliding said piece of rubber tubing over the pin or arm on the lug $e^8$ great facility and convenience are found in mounting the dampers or in exchanging the same, as no glue or other fastening means are required for holding the same in place. Where it is desirable to apply dampers of extraordinary thickness, two or more of such pieces of rubber tubing can be fitted one over the other. As a slot or perforation $n$ in the music-sheet arrives at the push-point $a'$, the latter is thrown upward into the said slot or recess by the action of the spring $g^7$, as shown in Fig. 8, whereby the forward arm of the lever $a$ is lifted and the rear arm is forced down, and in the descent of said rear arm of the lever $a$ the projection or arm $r$ of the lever $b^7$ bears against the bridge or support $m$, whereby the lever $b^7$ is shifted to the left, sliding in the guideways $u\ u\ u'$ on the side of the lever $a$. The distance that the lever $b^7$ is shifted is limited by the slot $w$ and the pin $v$. During the descent of the rear arm of the lever $a$ the finger $e^7$ of the lever $b^7$ slides freely past the end of the reed $h$, and only when said finger is below the end of the reed the lever $b^7$ is shifted to the left, as described, to carry the finger below the end of the reed. As the push-point of the lever $a$ is being forced down again, as shown in Fig. 9, the rear arm of the lever $a$ is forced upward and the finger $e^7$ of the lever $b^7$ is carried upward and strikes the end of the reed $h$, vibrating the same, the damper $f^7$ having been lifted from the reed before the finger actually strikes the same. In the further descent of the right-hand end of the lever-arm $a$ the arm or projection $s$ of the lever $b^7$ strikes against the bridge $m$, thereby shifting the lever $b^7$ to the right and back again to the original position, where it remains, as shown in Fig. 7, until the next slot or perforation $n$ of the music-sheet arrives at the push-point $a'$. The inner edge of the arm or projection $s$ is hollowed out or curved, so that when the push-point $a'$ is being forced down the shifting of the lever $b^7$ to the right does not begin until after the finger $e'$ has struck and vibrated the reed. The pressure exerted by the spring $g^7$ on the lug $e^8$ of the lever $b^7$ prevents the latter from being shifted accidentally or by any undue cause, and permits the shifting of said lever only by the positive impulse given either by one of the arms $r$ and $s$ of said lever $b^7$.

In the construction shown in Fig. 14 the lever $a$, provided with the push-point $a'$, is pivoted on the standard A' and is acted upon by a spring $i'$, which presses the push-point $a'$ in contact with the under side of the music-sheet N. The lever $b^8$ is guided by suitable lugs $u$ of the lever $a$ to slide on the side of said lever $a$, and said lever $b^8$ is provided with a finger $e^9$ and with the arm $e^{10}$ above said finger $e^9$, which arm $e^{10}$ carries a damper $f^8$. A spring $g^8$ bears on the arm $e^{10}$ and presses the same downward. The sliding lever $b^8$ is provided with the two lugs $r^8$ and $s^8$, arranged at the sides of the bar $A^2$, against which they can strike. This mechanism operates similar to the one shown in Figs. 7 to 13.

In the construction shown in Figs. 15, 16, and 17 the spring $i^{15}$ bears against the lever $a$ and against one end of the slide-lever $b^{15}$, which slide-lever is provided with a finger $e^{15}$ and the arm $e^{16}$, carrying the damper $f^{15}$. The lever $a$ is pivoted to the hollow bridge $A^3$, into which a pin $l$ projects from the lever $b^{15}$. The lever $b^{15}$ is provided with a slot through which the pin $c^{15}$, pivoting the lever $a$ to the bridge $A^3$, passes. A pin $v^{15}$, passing through a slot $w^{15}$ of the lever $b^{15}$, limits the throw of said lever $b^{15}$. As the levers swing under the action of the music-sheet, the tongue $l$ strikes against the sides of the hollow bridge $A^3$, whereby the lever $b^{15}$ is shifted in one direction or the other. The pin $v^{15}$, passing through the slot $w^{15}$, compels the lever $b^{15}$ to participate in the swinging movement of the lever $a$. In this construction only one spring is used, whereas in the construction shown in Fig. 14 two springs are used. With this construction a device for moving the several push-point levers out of the way when the music is to be changed can easily be applied. If such a device were not applied, it might easily happen that some or all of the push-point levers $a$ might be forced down, and this would cause the music-sheet to be torn, or some of the tongues might be injured. The device provided serves for pressing down all the push-point levers without operating the tongues. The lever $b^{15}$ is provided with a downwardly-projecting hook-arm X, adapted to receive the arm $y'$ of the lever-arm $y^2$ of said lever, being the fulcrum on which said lever is turned in the bridge $A^3$, the upwardly-projecting arm of said lever serving as a handle. The spring $z$, attached to said arm $y$ and to the bridge $A^3$, serves to hold the arm $y$ of the lever in a vertical position. When the music-sheet is to be exchanged, the arm $y$ of the lever is swung down, so as to cause the arm $y^2$ to engage the several hook-arms $x$ of the several levers $b^{15}$, whereby the said levers $b^{15}$ are first shifted in the direction from the ends of the tongues $h$ and then forced down, at the same time pressing down the push-point levers $a$, whereby the push-points $a'$ of the same are lowered so as not to interfere with the music-sheet.

Musical instruments in which the sound-producing devices are operated by a traveling music-sheet are usually provided with a mechanism or device which prevents injury to the push-point levers by the music-sheet during the exchange of said sheet, and this device usually consists of a special lever by which the set of push-point levers are forced down before the music-sheet is exchanged. If with the devices generally employed the operator should omit to make inoperative the set of push-point levers before lifting the retaining-bar—that is, before introducing another music-sheet—the push-point levers will easily be damaged and the sheet torn. I have the following contrivance to prevent this: On the base-plate $p$, Fig. 22, a standard $q$ is fixed, the upper end of which is forked to receive the hinged end of the bar $t$, which can be lifted, as shown in Fig. 23. The inside of said bar is curved, so as to have a U-shaped cross-section, as shown in Fig. 31, and into the groove of said bar the push-points $a'$ of the levers $a$ pass whenever the said push-points have entered the slots or apertures of the sheet. The swinging end of said retaining-bar $t$ is provided with a longitudinal slot $t'$, through which the stem $j$ passes that is mounted to turn on the base-plate $p$, and is provided at its upper end with a thumb-piece that can be passed through the said slot $t'$ when turned into position parallel with said slot. Said rotative stem $j$ is provided with an eccentric-collar $i^2$, which can strike against suitable stops, thus limiting the rotative movement of said stem to a quarter-turn. The collar $i^3$ is provided on its under side with an oblique face $i^4$, adapted to act on the free end of the arm $l^4$, connected to and projecting from the bar $k^4$, which extends over the lower side of the push-point levers, and is either mounted to swing on the same axis as the push-point levers or on a separate axis, as may be desired. If a new music-sheet is to be introduced for the one last played, the thumb-plate of the upper end of the stem $j$ is so turned as to be parallel to the slot $t'$ in the bar $t$, so as to permit of lifting the said bar, as shown in Fig. 23. By turning the stem into said position the oblique face $i^4$ on the under side of the collar $i^3$ forces the arm $l^4$ downward, whereby the bar $k^4$ is also forced downward. The music-sheet can now be safely exchanged after the bar $t$ has been raised. When a new sheet has been inserted, the bar $t$ is also forced downward and the stem $j$ is turned forty-five degrees, whereby the arm $l^4$ and bar $k^4$ are raised, permitting the push-point levers to rise to their normal position.

In the construction shown in Figs. 25 and 26 the bar $k^4$ is replaced by the angle-lever $k^6$, arranged below the striking-arms $e$ of the push-point levers $a$ to support the same. The bar or ledge $o^5$ is arranged above and across the said push-point levers $a$ and said arms $e$, to limit the upper throw. By means of the stem $j$ and collar $i^4$ the rear arm of the angle-levers $k^6$ is forced down, and the front arm is thereby raised and the arms $e$ lifted against the bar $o^5$. Thereby the push-points $a'$ are forced downward, and the striking-fingers, with the arms $e$, are carried vertically past the ends of the reeds or tongues without in any way injuring the same.

Having thus described my invention, what I claim as new, and desire to secure by Letters Patent, is—

1. In a mechanical instrument, the combination, with a push-point lever, of a tongue or reed actuating arm operated from the push-point lever, a fixed bar forming an abutment for the tongue or reed actuating arm, and a spring-bearing on the tongue or reed actuating arm, substantially as set forth.

2. In a mechanical musical instrument, the combination, with a swinging push-point lever, of a tongue or reed actuating arm movably connected with said push-point lever, a fixed bar or rail forming an abutment for the tongue or reed actuating arm, and a spring acting on said tongue or reed actuating arm, substantially as set forth.

3. In a mechanical instrument, the combination, with a swinging push-point lever, of a tongue or reed actuating arm connected movably with the push-point lever and adapted to move toward and from the end of the tongue or reed that it actuates, a fixed bar or ledge forming an abutment for the tongue or reed actuating arm, and a spring acting on said tongue or reed actuating arm, substantially as set forth.

4. In a mechanical musical instrument, the combination, with a swinging push-point lever, of a tongue or reed actuating arm movably connected with and operated from the push-point lever, which reed or tongue actuating arm is adapted to move toward and from the end of the reed or tongue, a fixed bar or ledge forming an abutment for the reed or tongue actuating arm, a spring acting on said arm, and a damper operated by said reed or tongue actuating arm, substantially as set forth.

5. In a mechanical musical instrument, the combination, with a series of push-point levers and reed or tongue actuating arms connected therewith, of a hollow retaining-bar, into which the push-points of the levers can pass, a rotative locking-stem for said retaining-bar, a cam on said rotating stem, and a bar extending across the push-point levers and adapted to be actuated by said arm, substantially as set forth.

6. In a mechanical instrument, the combination, with a series of push-point levers and reed or tongue actuating arms connected therewith, of a grooved retaining-bar into which the push-points can pass, said retaining-bar being provided with a longitudinal slot, a rotating stem having a flat head adapted to pass through the slot in the retaining-bar, which stem serves for locking the retaining-bar in place, a cam-face formed on said rotative stem, and a bar extending across the push-point levers and having an arm on which the cam on the rotative stem can act, substantially as set forth.

In testimony that I claim the foregoing as my invention I have signed my name in presence of two subscribing witnesses.

F. PIETSCHMANN.

Witnesses:
   GEORGE RERCHELT,
     *Zions Kirchstr.*, 38.
   ADOLF LAGEMANN,
     *Veteranestr.*, 14.